Patented Apr. 15, 1924.

1,490,774

UNITED STATES PATENT OFFICE.

CHARLES HARNIST, OF BERLIN, GERMANY.

PROCESS FOR THE MANUFACTURE OF ARTIFICIAL FERTILIZERS.

No Drawing.      Application filed September 2, 1921. Serial No. 498,090.

(GRANTED UNDER THE PROVISIONS OF THE ACT OF MARCH 3, 1921, 41 STAT. L., 1313.)

*To all whom it may concern:*

Be it known that I, CHARLES HARNIST, residing at Berlin, Germany, have invented a certain new and useful Improved Process for the Manufacture of Artificial Fertilizers, of which the following is a specification.

The present invention relates to a process for the manufacture of nitrogenous fertilizers.

Ammonia compounds are incorporated into waste organic matters, especially into such of vegetable character, which may be in the form of solid substances in wood, grass, alpha fibres, etc., or in the dissolved form in the waste liquors of breweries, distilling and sugar factories and so on and particularly of cellulose factories.

By the term "incorporating" is to be understood in the present case an intimate or almost molecular mixture with the said compounds, or even an introduction of the same into the molecule of the organic substances, that is to say the generation of a chemical compound.

By this so-called "incorporating" of another fertilizer the original value of the organic matters as carbonic acid manure is increased and brought more fully into manifestation.

The highest fertilizing value is attained by incorporating ammonia compounds, because by the said intimate mixture the greatest utilization of the organic matters as food for nitrifying bacteria is added to the above mentioned increase of the fertilizing value.

In consequence thereof the fertilizer obtained forms a powerful medium for developing nitrifying bacteria, which latter increase the formation of carbonic acid and which also increase the amount of ammonia assimilated.

An organic nitrogen fertilizer therefore results which is equal in effect to the natural manure.

The simplest way would be to introduce into the said waste liquors sulfate of ammonium and to evaporate such solution, whereby the most intimate mixture of the intermingled matters is obtained.

It has, however, been found in practice that the most advantageous auxiliary means for incorporating ammonia is sulfurous acid.

The salts of sulfurous acid thereby formed must then be converted into salts of sulfuric acid, which latter are more adapted for top-dressing.

The employment of ammonia and sulfurous acid has the following advantages:

First: They are adapted in like manner for solid organic substances, as for instance such containing cellulose, and for the dissolved organic substances (in waste liquors). This extension of the employment of both reagents for solid and dissolved organic matters is therefore an important feature of this invention.

Second: In their employment for solid matter they permit a double advantageous treating, on one hand an ammoniacal and on the other hand an acid treatment, whereby a partial entrance of ammonia into the waste matters is obtained, and whereby it is possible to exclude the matters injurious or useless for manure from the waste liquor, such matter being for example resin, tannin matters or the valuable cellulose. They further permit of substances which are useful as manure being separated from the cellulose in a better way than the means hitherto used for the same purpose.

Third: The gaseous state of the reagents enables them to be recovered after treatment. It also enables them to act on the solid organic substances without addition of water, because the moisture contained therein is sufficient for the treatment. Thus I obtain a concentrated and nevertheless uniform effect and also save a considerable amount of ammonia.

Fourth: The liquefied state of both chemical reagents ($NH_3$, $SO_2$) has further technical advantages, which are evident from the following examples:

I.

The material containing cellulose is treated first with $SO_2$ and hereafter with $NH_3$, in case it contains a large quantity of tannin matters; but when containing resin or other substances soluble in ammonia, it is first treated with $NH_3$ and hereafter with $SO_2$. In the case of wood of Coniferæ rich in resin, ammonia gas is for instance introduced from below into the receptacle or boiler filled with the chips, until its odour is smelled at the upper end of the said receptacle. The quantity of gas depends on the amount of moisture and on the nature of the raw material. The gas may be introduced in a cold state, the absorption being facilitated under these conditions; in case the material is heated, the absorption may also readily be effected by application of suitable pressure. In case the wood does not contain sufficient moisture, the introduction of gas may be preceded by a short steaming. After this the receptacle is closed; if required, ammonia gas is introduced from the flask or container by its own pressure. The raw material is now treated for a certain period of time at increased pressure, obtained by heat or compressed air, until no more acid components are dissolved. A strong heating by ammonia has an injurious effect on the cellulose. The ammonia is now expelled, as by direct introduction of steam, together with the other volatile substances, and recovered. The remaining matter is treated with wet steam, in order to separate it from the dissolved matters, or also washed with water. Sulfurous acid is introduced into the solution while it is still hot; the precipitating matters are separated from the residual solution and any present tannin matter is precipitated in any known manner, as by glue or sulfite of aluminium.

The remaining solution is used for the second treatment which, if necessary, is carried out at a raised temperature and pressure. If required, another quantity of sulfur dioxide can first be introduced into the liquor. If the quantity of free or chemically bound ammonia left in the wood and in the liquor is very small, the temperature used in the treatment with the sulfur dioxide should not exceed 90–100°.

This second treatment can however also be carried out after merely introducing sulfur dioxide without adding more water and, in certain cases, also without expelling the ammonia, the avidity for neutralization with residual ammonia causing the acid to penetrate the raw material as easily, as it was previously caused to do this by the avidity of the ammonia to dissolve in the moisture of the wood.

For the better dissociation of the substances it is, however, advantageous to cover the material with water, at least near the end of the second treatment. This water can of course be added at any stage, as for example at the end, or even at the beginning of the first treatment and, if desired, in the form of a solution of the reagent. It would be advantageous to employ the liquor resulting from the first treatment for the second treatment after adding $SO_2$. For it has been found that by the presence of the bodies left behind in the liquor of the first treatment (such as gum- and sugarmatter) the effect of the sulfur dioxide on the cellulose is considerably softened. It is therefore sometimes advisable to add such matter in order to produce this result, for instance melasse or vinasse or distillery residues and so on.

The two treatments can be carried out once in succession or repeatedly and alternately.

II.

When using $SO_2$ and $NH_3$ in a liquid or compressed state, they can advantageously proceed by introducing a certain quantity of the first or the second gas into the boiler filled with wood, and the water can be added before or after the introduction of the gas. By suitable addition of the gases one can alternately boil them in the simplest way, either alkaline or acid, and thereby obtain by the same process all effects of the different cooking possibilities for the wood. For precipitation by neutralization the liquor can be drawn off of the boiler from time to time and can be separated from the extracted parts. It has been found that the heating under pressure of the neutralized liquor in some cases effects a precipitation.

With the present process it is advisable to heat the liquor outside of the boiler in the known manner and also to introduce the gases into the liquor circulating, outside of the boiler under pressure.

The liquors obtained according to the above specified examples contain the nitrogen partially in the molecule, partially as ammonia salt with sulfo-lignins or sulfurous acid combined.

In order to obtain a good fertilizer, the sulfurous acid, which has an injurious effect on plants, must be removed or better oxidized, and the liquor concentrated, according to whether a liquid or solid fertilizer is required. This is best carried out after the following methods, which both, besides this action, include a technical effect.

The liquors are caused to trickle through towers, provided with means of distribution, and the down-flowing liquor is met by a current of hot roast gases from sulfur or pyrites furnaces. In this way the oxygen usually contained in the roast gases convert the sulfite of ammonium of the liquor into sulfate, and the $SO_3$ absorbed by the liquor from the roast gases contributes to the decomposition of the sulfo-lignins and the expulsion of the sulfurous dioxide. By controlling the flow of the liquors through the tower so that they leave the latter at a temperature of more than 90°, the sulfo-lignins are still further decomposed, and in certain cases the sulfur group may be completely eliminated and the sulfurous acid expelled together with other volatile substances (acetone, methyl alcohol and so on), which may be recovered in any known way. The liquor is then neutral or at the most sulfated, and can be readily neutralized by addition of the requisite quantity of ammonia. It is then suitable for use as a fertilizer, or may be submitted, without any further treatment, to alcoholic fermentation. This fermentation has the advantage that the decomposition of organic matters of the resulting fertilizer is inconsiderably increased by them.

Alternatively, furnace gases may be employed but not so advantageously. These also aid in neutralizing and concentrating the liquors, partly decompose the sulfo-lignins and, if excess of oxygen be present, oxidize the sulfites.

Instead of burning gases with sulfur dioxide also other gases containing nitrogen may be used, as for instance the waste gases of sulfuric acid or oleum factories, or even air.

It will be appreciated that the production of the residual liquors utilizable for fermentation or fertilizing purposes is not restricted to liquids obtained for the particular process described. Liquors resulting from known methods of cellulose manufacture may also be treated with ammonia and sulfur dioxide and other waste liquors poor in nitrogen, such as molasses residues, may be similarly enriched in this element by addition of ammonia and sulfur dioxide. An advantageous method of incorporating such waste liquors with ammonia and sulfur dioxide, of transforming the sulfite into sulfate and of concentrating the liquor is as follows:

The liquor may be at first concentrated, for instance, as indicated above, or subsequent to fermentation and distillation of the alcohol, and is then saturated with bisulfite of ammonium by the introduction of ammonia and sulfurous acid, preferably in gaseous form and the concentrated solution is then heated under pressure at 150° whereby ammonium sulfite and sulfuric acid and sulfur are produced (reaction of Barbaglia and Gucci). The sulfo-lignins are decomposed by the free acid. The temperature at which this conversion is effected may be reduced by the addition of polysulfur compounds, such as thionates, polythionates or thiosulfates. To avoid the too violent reaction which results with large quantities of the liquor, it is preferred to introduce the liquid that is to be heated in small quantities as follows:

The liquor, saturated with ammonium bisulfite, is introduced into an autoclave which is preferably cone-shaped at its base. When the reaction has moderated, more liquor is run into the autoclave and the process is repeated, until the whole quantity of the saturated liquor has been added. Then, by a continuous supply of gaseous ammonia and sulfur dioxide under pressure, the greatest possible concentration of bisulfite is maintained. Neutral sulfite of ammonium may also be added up to at least one molecule to two molecules of the bisulfite ($4NH_3 : 3SO_2$). The reaction proceeds quietly, and the temperature can be reduced, in some cases below 100°. The mixture of sulfur and sulfate and organic matters, which collect in the cone of the autoclave, is removed from the latter from time to time. For this purpose, the autoclave is advantageously provided with a tubular conduit at the base, having two valves, the upper valve permitting the solid materials to pass into the conduit, whence they can be discharged by closing the first valve and opening the second.

The sulfur and sulfates are separated by dissolving the latter in fresh liquor, and the sulfur, recovered by centrifuging the hot solution from which the sulfate, is subsequently allowed to crystallize out. By taking advantage of the greater solubility of bisulfite, it is possible to complete the precipitation of the sulfate by further introduction of ammonia and sulfur dioxide in suitable proportion. The remaining liquor can be returned to the autoclave for the purpose of replacing the liquor which has been withdrawn together with the sulfur and sulfate precipitate.

It has been found by test in some cases that a precipitation of the greatest quantity of the organic matters is obtained by raising the temperature beyond the degree necessary for the conversion. This precipitation is probably due to the decomposition of organic matters by the sulfuric acid.

In carrying out the process described above, i. e., the introduction of sulfur dioxide and ammonia into liquors obtained according to the present invention, it has also been found that a precipitation of organic substances and a decolorization of the liquor can be attained. This latter precipitation takes place, when the introduction into the cold or warm liquor has been carried out for some time at an ordinary or raised pressure. It is immaterial, whether the liquid is maintained neutral, acid or alkaline. In order, however, to avoid a simultaneous precipitation of ammonium sulfite, it is advisable to work with an excess of sulfurous acid. The precipitate obtained contracts in the heat, owing to which it can be readily separated.

This possibility of the precipitation of organical substances from the liquors in question is the more surprising as, for precipitation of the solved matters, the same chemical means are used, which previously effected the solution of the organic matters.

This precipitation and decolorization can also be effected in the case of ordinary sulfite or soda cellulose liquor, or with other liquors containing organic substances.

Summary.

In the preceding paragraphs two examples of processes for incorporating ammonia and sulfur dioxide into solid vegetable matters, i. e., into substances containing cellulose, have been described.

The substances capable for use as manure are separated from the injurious matters and from the cellulose useless as a fertilizer. As this separating by means of ammonia and sulfurous acid is more perfect than the freeing by other well known means, these examples may likewise serve for the improved production of cellulose.

The last two examples show in what manner the sulfurous acid may be advantageously oxidized and the liquor concentrated in different ways and hereby improved in its effect as a fertilizer.

Since the conditions that render a substance capable of acting as a manure are the same as those that make it available for fermentation, the said examples may likewise be employed for the preparation of the liquors for alcoholic fermentation.

These examples also show in which manner the incorporation of $SO_2$ and $NH_3$ into vegetable matters dissolved in waste liquors of any kind whatever may be effected.

I claim:—

1. Process for producing nitrogenous fertilizers consisting in treating useless organic matters with ammonia and sulfur dioxide for the purpose of incorporating ammonia into these matters.

2. Process for producing nitrogenous fertilizers consisting in treating useless vegetable matters with ammonia and sulfur dioxide in the presence of $H_2O$, the incorporation of ammonia being rendered possible by these means both into the dissolved matters contained in waste organic liquors and into the undissolved useless matters contained in all vegetable matter before chemical treatment, while dissolving the same.

3. Process for producing nitrogenous fertilizers consisting in treating useless organic matters with ammonia and sulfur dioxide in the presence of $H_2O$ and in thereafter converting the sulfites formed into sulfates.

4. Process for producing nitrogenous fertilizers consisting in treating, with ammonia and sulfur dioxide, soluble organic matters contained in waste liquors, until a precipitation of organic matters takes place and in thereafter converting the sulfites formed in the liquor into sulfates.

5. Process for producing nitrogenous fertilizers consisting in treating with ammonia and sulfur dioxide the waste liquors of cellulose factories and in thereafter converting the sulfites formed into sulfates.

6. Process for producing nitrogenous fertilizers consisting in treating with ammonia and sulfur dioxide vegetable matter in the presence of $H_2O$ and in applying pressure.

7. Process for producing nitrogenous fertilizers consisting in separately treating under pressure vegetable matters with ammonia and sulfur dioxide in the presence of $H_2O$ and in thereafter converting the sulfites formed into sulfates.

8. Process for producing nitrogenous fertilizers consisting in alternately treating under pressure vegetable matters with ammonia and sulfur dioxide in the presence of $H_2O$ and in thereafter converting the sulfites formed into sulfates.

9. Process for producing nitrogenous fertilizers consisting in separately treating under pressure vegetable matters with ammonia and sulfur dioxide in the presence of only that moisture that is contained in these matters and in thereafter converting the sulfites formed into sulfates.

10. Process for producing nitrogenous fertilizers consisting in separately treating under pressure vegetable matters with ammonia and sulfur dioxide, water being added during the treatments and in thereafter converting the sulfites formed into sulfates.

11. Process for producing nitrogenous fertilizers consisting in separately treating under pressure vegetable matters with ammonia and sulfur dioxide in the presence of the same $H_2O$ in each case, the deposit precipitated by neutralization of the liquor being removed.

12. Process for producing nitrogenous fertilizers consisting in separately treating under pressure vegetable matters with ammonia and sulfur dioxide in the presence of the same $H_2O$ in each case, the deposit precipitated by neutralization of the liquor and another deposit precipitated by addition of precipitant of tannin matters being removed and in thereafter converting the sulfites formed into sulfates.

13. Process for producing nitrogenous fertilizers consisting in separately treating under pressure vegetable matters with ammonia and sulfur dioxide in the presence of the same $H_2O$ in each case, the gases being introduced gradually under pressure and in thereafter converting the sulfites formed into sulfates.

14. Process for producing nitrogenous fertilizers consisting in separately treating under pressure vegetable matters with ammonia and sulfur dioxide in the presence of the same H₂O in each case, the gases being introduced gradually and the substances precipitated in each case by neutralization being separated under pressure and in thereafter converting the sulfites formed into sulfates.

15. Process for producing nitrogenous fertilizers consisting in separately treating under pressure vegetable matters with ammonia and sulfur dioxide in the presence of the same H₂O in each case, expelling and recovering the reagent together with the other volatile substances of the treated matters by means of steam after the first treatment and in thereafter converting the sulfites formed into sulfates.

16. Process for producing nitrogenous fertilizers consisting in separately treating under pressure vegetable matters with ammonia and sulfur dioxide in the presence of H₂O, in treating the obtained waste liquor with ammonia and sulfur dioxide and in thereafter converting the sulfites formed into sulfates.

17. Process for producing nitrogenous fertilizers consisting in treating waste organic matters with ammonia and sulfur dioxide in the presence of H₂O and in thereafter treating the obtained liquor with hot gases containing oxygen.

18. Process for producing nitrogenous fertilizers consisting in treating waste organic matters with ammonia and fulfur dioxide in the presence of H₂O and in thereafter treating the obtained liquor with hot gases containing oxygen in the presence of oxidizing catalyzers.

19. Process for producing nitrogenous fertilizers consisting in treating waste organic matters with ammonia and sulfur dioxide in the presence of H₂O and in thereafter treating the obtained liquor with hot air in the presence of oxidizing catalyzers, the air remaining after this latter treatment in the form of pure nitrogen.

20. Process for producing nitrogenous fertilizers consisting in treating waste organic matters with ammonia and sulfur dioxide in the presence of H₂O and in thereafter treating the obtained liquor with hot gases of combustion containing oxygen in the presence of oxidizing catalyzers.

21. Process for producing nitrogenous fertilizers consisting in treating waste organic matters with ammonia and sulfur dioxide in the presence of H₂O and in thereafter treating the obtained liquor with hot gases containing sulfur dioxide and oxygen in the presence of oxidizing catalyzers.

22. Process for producing nitrogenous fertilizers consisting in treating waste organic matters with ammonia and sulfur dioxide in the presence of H₂O and in thereafter treating the obtained liquor with roast gases of sulfur containing oxygen in the presence of oxidizing catalyzers, the said roast gases remaining, after this latter treatment and after the sulfur dioxide has been removed from the said roast gases, in the form of pure nitrogen.

23. Process for producing nitrogenous fertilizers consisting in treating waste organic matters with ammonia and sulfur dioxide in the presence of H₂O and in thereafter treating the obtained liquor with roast gases of pyrites containing oxygen in the presence of oxidizing catalyzers, the said roast gases remaining, after this latter treatment and after the sulfur dioxide has been removed from the said roast gases, in the form of pure nitrogen.

24. Process for producing nitrogenous fertilizers consisting in treating sulfite liquor with ammonia and sulfur dioxide and in thereafter treating the obtained liquor with hot gases containing oxygen, the remaining liquor being rendered capable by this latter treatment of being subjected to alcoholic fermentation.

25. Process for producing nitrogenous fertilizers consisting in separately treating under pressure vegetable matters with ammonia and sulfur dioxide in the presence of the same H₂O in each case, in treating the obtained liquor with hot gases containing oxygen, in subjecting the liquor to the alcoholic fermentation, in incorporating ammonia and sulfur dioxide into the liquor freed from alcohol and in thereafter converting the sulfites contained in the liquor into sulfates.

26. Process for producing nitrogenous fertilizers consisting in treating waste organic matters, in which ammonia and sulfur dioxide are incorporated, with hot gases containing oxygen.

27. Process for producing nitrogenous fertilizers consisting in heating under pressure the waste liquors, in which ammonia and sulfur dioxide are incorporated to convert the sulfites formed into sulfates.

28. Process for producing nitrogenous fertilizers consisting in treating waste organic matters with ammonia and sulfur dioxide in the presence of H₂O, in thereafter converting the sulfites formed in the liquors into sulfates and in finally concentrating the liquor obtained.

29. A nitrogenous fertilizer in which sulfate of ammonia is mixed with the molecules of waste organic matters to constitute a powerful medium for bacterial development.

30. A nitrogenous fertilizer composed of waste organic matters in which nitrogen and sulfur are incorporated partly by molecular connection of ammonia and of sulfurous acid with the organic matters, partly by molecularly mixing of the latter with sulfate of ammonia to form a powerful medium for bacterial development.

31. Process for producing nitrogenous fertilizers consisting in separately treating under pressure vegetable matters with ammonia and sulfur dioxide in the presence of the same $H_2O$ in each case, the neutralization being effected under pressure and in thereafter converting the sulfites formed into sulfates.

32. Process for producing nitrogenous fertilizers consisting in treating with ammonia and sulfur dioxide dissolved organic matters contained in waste liquors, the ratio of sulfur dioxide to ammonia being at least 3:4, and in thereafter converting the sulfites contained in the liquor into sulfates by heating the liquor under pressure.

33. Process for producing nitrogenous fertilizers consisting in treating with ammonia and sulfur dioxide dissolved organic matters contained in waste liquors, the ratio of sulfur dioxide to ammonia being at least 3:4, and in thereafter heating the liquor under pressure in the presence of polythionates.

34. Process for producing nitrogenous fertilizers consisting in treating with ammonia and sulfur dioxide dissolved organic matters contained in waste liquors, the ratio of sulfur dioxide to ammonia being at least 3:4, and in thereafter heating the liquor under pressure whereby by means of continuous admission under pressure of $NH_3$ and $SO_2$ and of liquor a constant concentration is maintained.

35. Process for producing nitrogenous fertilizers consisting in treating with ammonia and sulfur dioxide dissolved organic matters contained in waste liquors, the ratio of sulfur dioxide to ammonia being at least 3:4, and in thereafter heating the liquor under pressure, whereby, by raising the temperature beyond the degree necessary for the conversion, a precipitation of organic substances takes place.

36. A nitrogenous fertilizer in which sulfate of ammonia is mixed with waste organic matters to constitute a powerful medium for bacterial development and which also contain another commercial fertilizer as a mixture.

37. A nitrogenous fertilizer composed of waste organic matters in which nitrogen and sulfur are incorporated partly by molecular connection of ammonia and of sulfurous acid with the organic matters, partly by molecularly mixing of the latter with sulfate of ammonia to form a powerful medium for bacterial development and which also contain another commercial fertilizer as a mixture.

In witness whereof I have hereunto subscribed my name in the presence of two witnesses.

CHARLES HARNIST.

Witnesses:
 FRIZ TOFOOT,
 M. RAYF.